Sept. 29, 1942.  J. ASHWORTH  2,296,824

LIQUID PURIFYING APPARATUS

Filed March 18, 1938   7 Sheets-Sheet 1

Inventor:
James Ashworth,
By: Theodore W. Miller
Attorney.

Sept. 29, 1942. J. ASHWORTH 2,296,824
LIQUID PURIFYING APPARATUS
Filed March 18, 1938 7 Sheets-Sheet 2
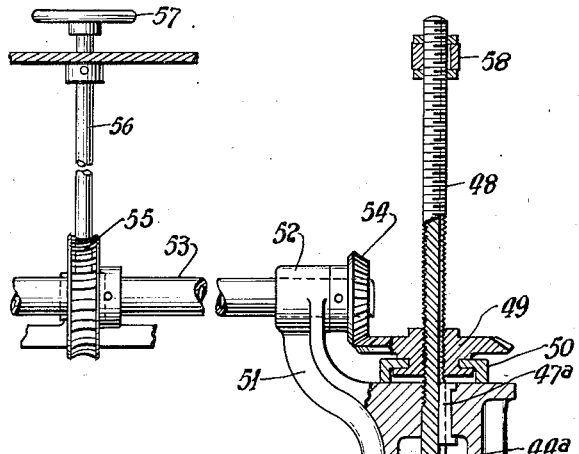
Fig. 3.
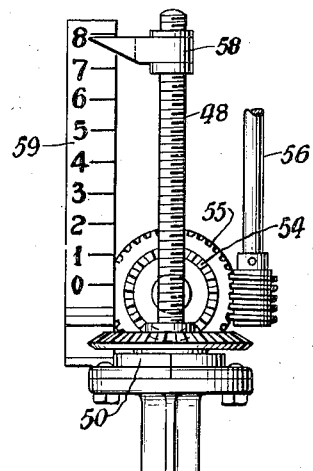
Fig. 4.
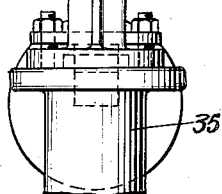
Fig. 5.
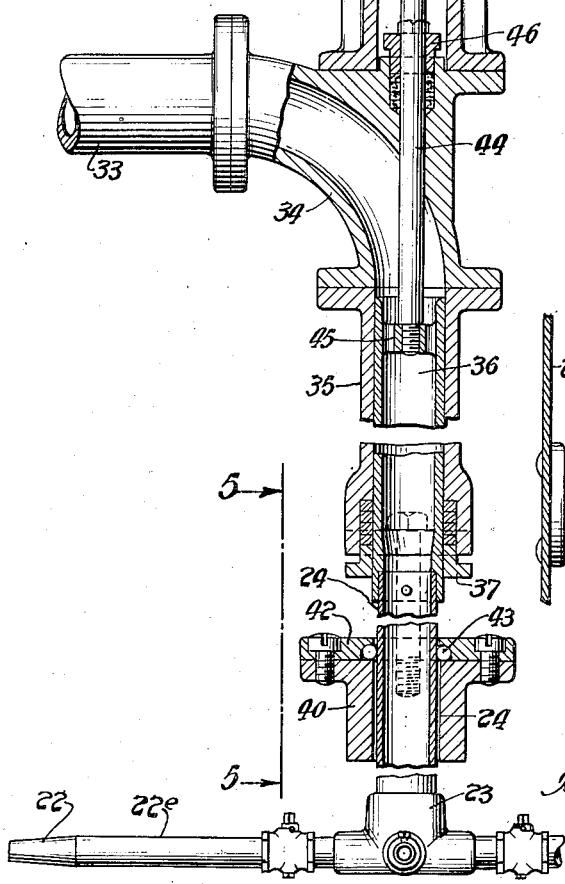
Inventor
James Ashworth,
By Theodore W. Miller
Attorney.

Sept. 29, 1942.   J. ASHWORTH   2,296,824
LIQUID PURIFYING APPARATUS
Filed March 18, 1938   7 Sheets-Sheet 3
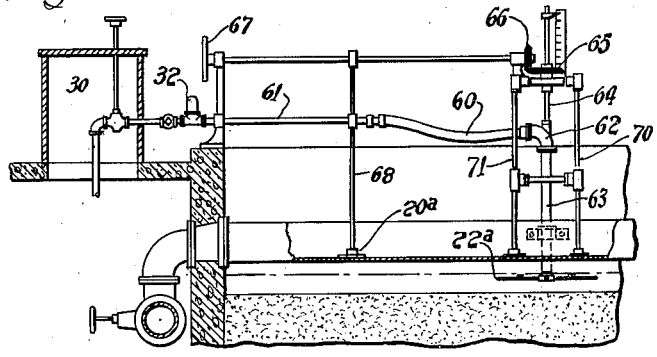
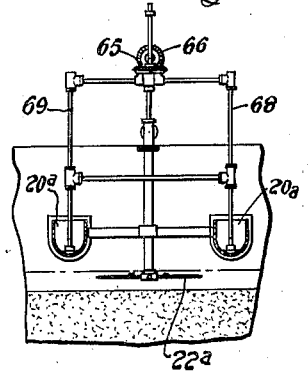
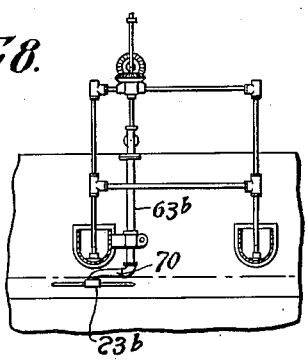
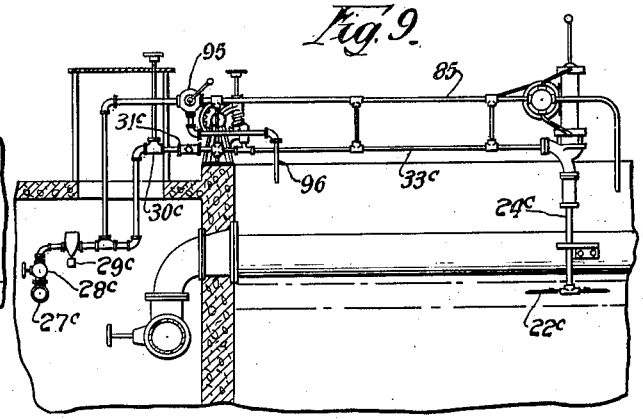
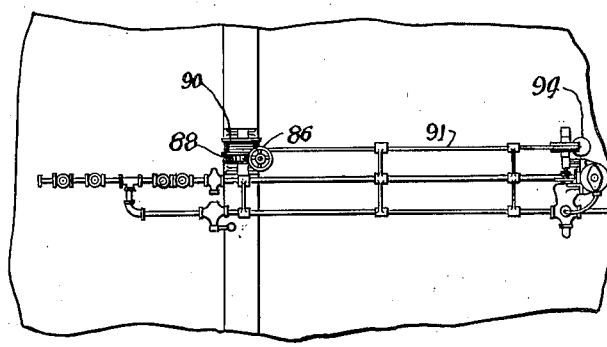
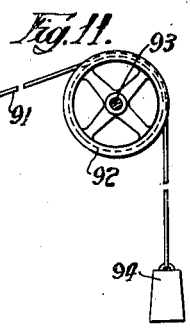
Inventor:
James Ashworth,
By: Theodore W. Miller
Attorney.

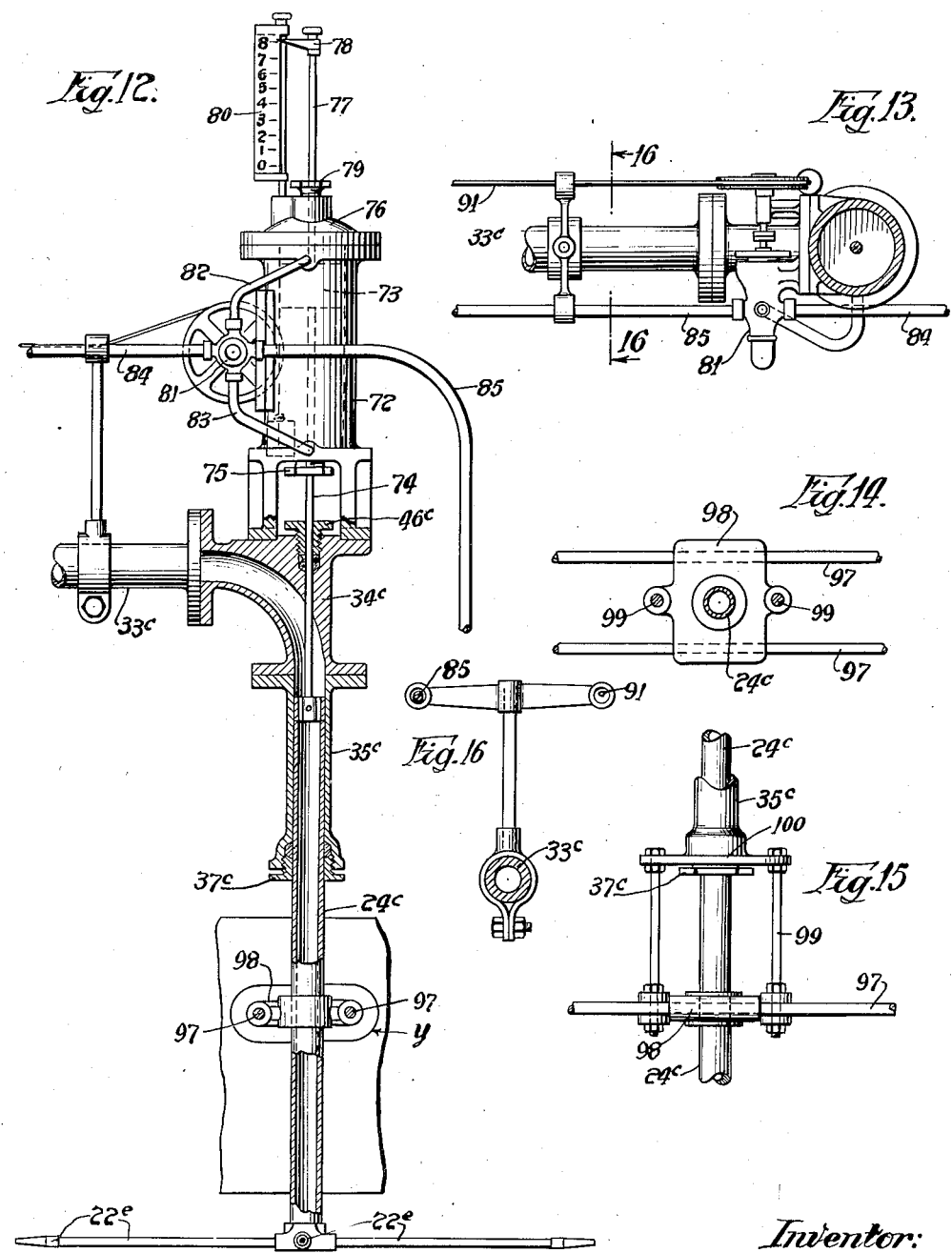

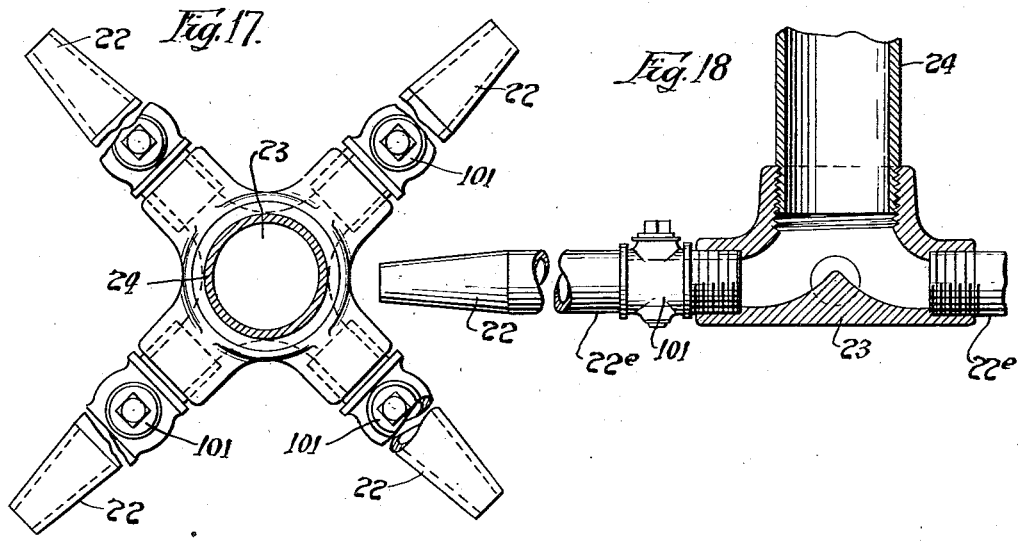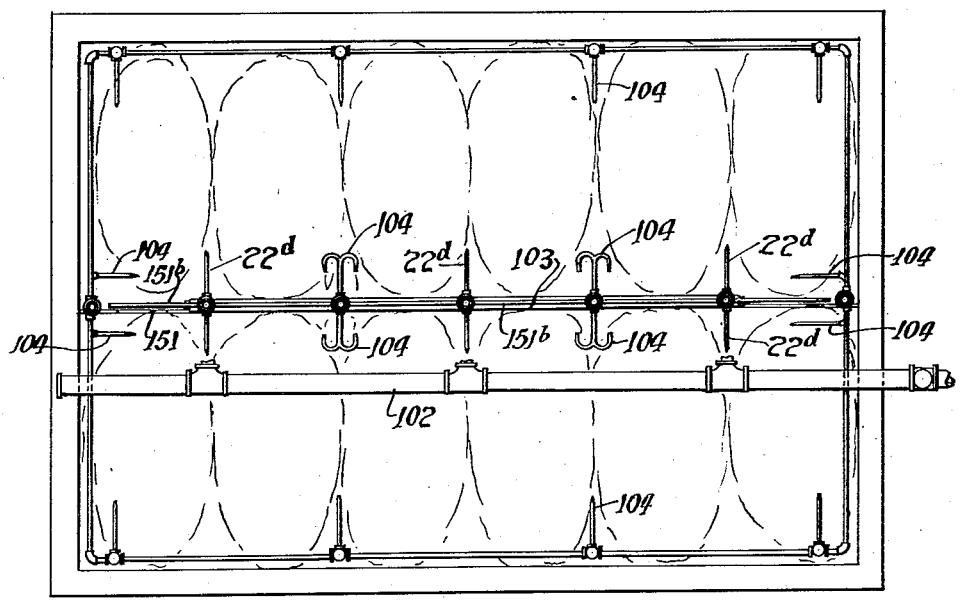

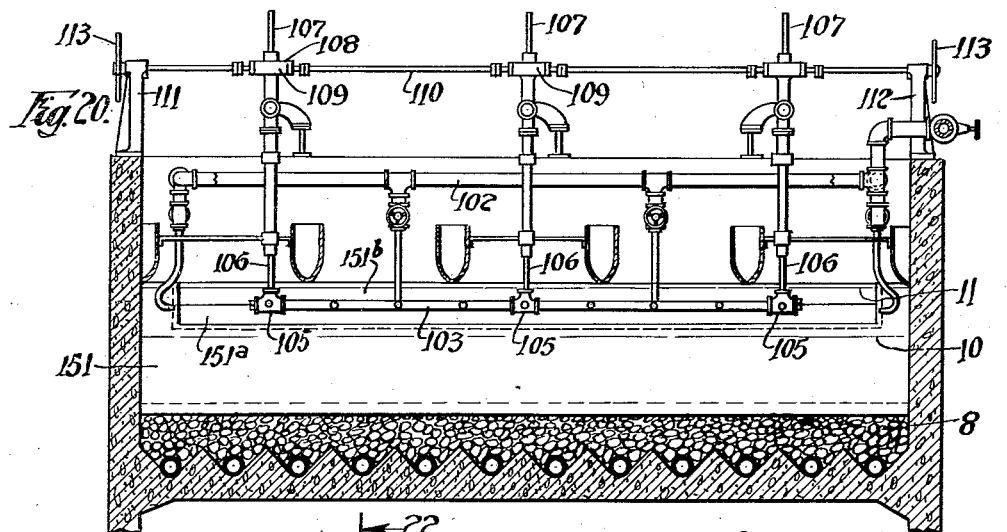
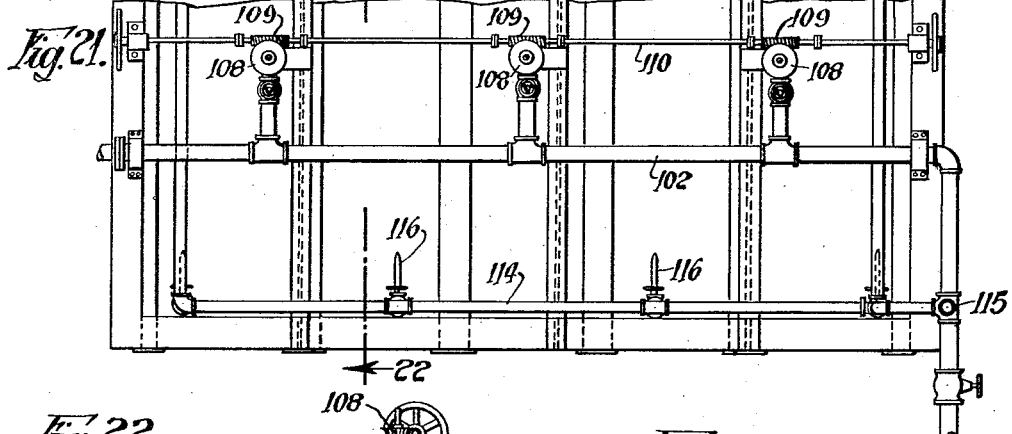
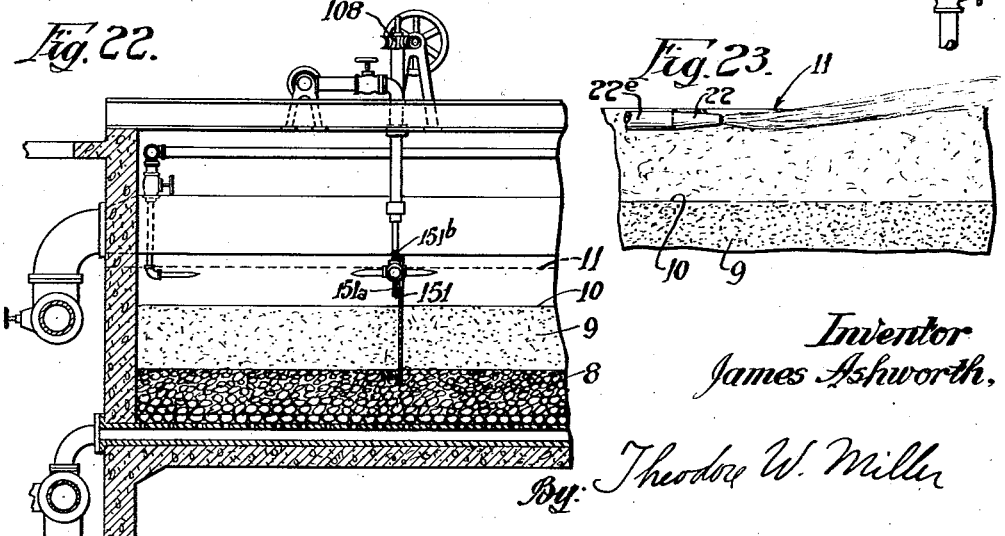

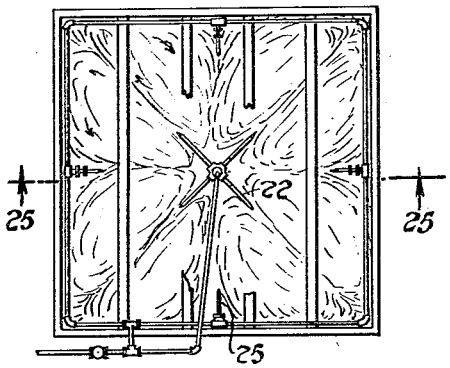
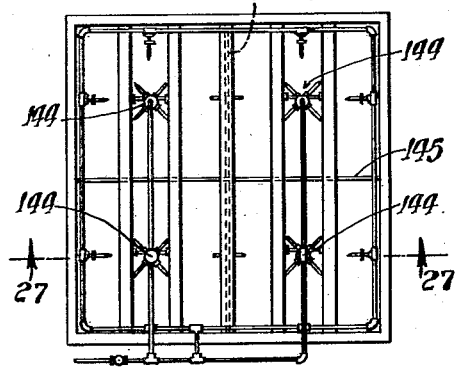
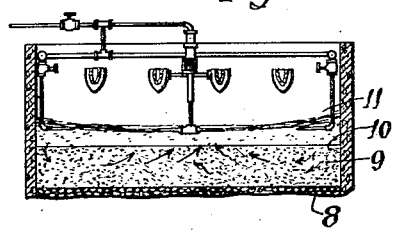
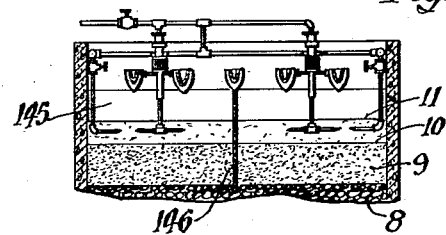
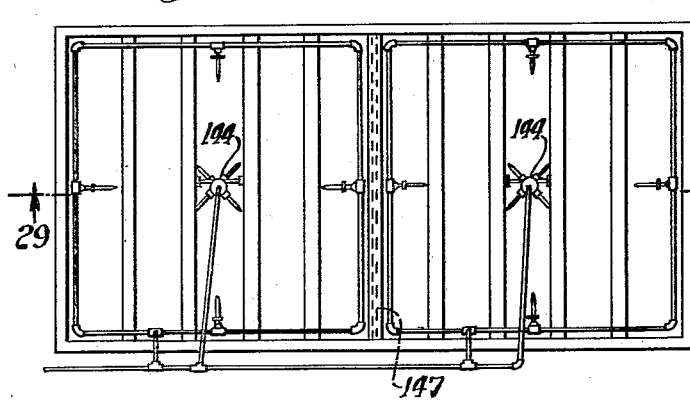
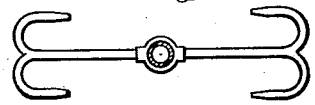
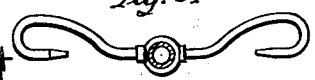
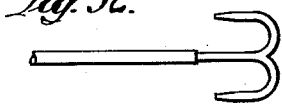
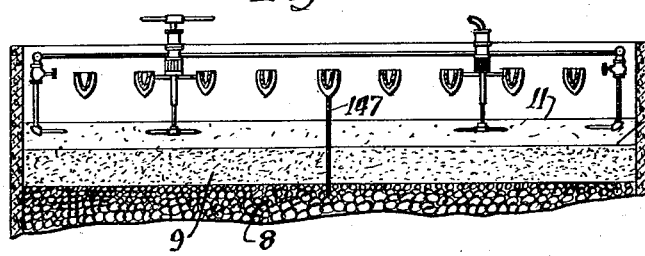

Patented Sept. 29, 1942

2,296,824

UNITED STATES PATENT OFFICE 2,296,824

LIQUID PURIFYING APPARATUS

James Ashworth, Waukegan, Ill.

Application March 18, 1938, Serial No. 196,743

4 Claims. (Cl. 210—130)

This invention relates to methods and apparatus for washing, cleaning or renovating filtering materials or media, such as are used in liquid filters, and for removing accretions to such materials or media.

It is well known that, in water supply purification systems, in eliminating foreign matter from liquids by the process of filteration, the interstices or voids in the material of the filter bed or body through which the liquid to be clarified passes, become more or less filled or impregnated with the retained or separated impurities. If this process is permitted to continue for too long a period of time, the filter bed may become completely "clogged up" and no more liquid can be passed through. It is common practice in filtration plants to endeavor to remove these entrained impurities or impediments, when the loss of head due to such obstructions in the bed has reached a given maximum, by shutting off the raw-water supply and manipulating certain control valves permitting filtered water to be forced up through the gravel and sand beds thus mechanically removing the greater portion of such separated matter. This flow in the direction opposite to that of filtering is commonly called "wash-water." The rate of flow of the wash-water will depend principally upon its effective head, the characteristics of the filtering medium and of the entrained impurities, the design of the under-drain system, waste-water troughs and waste-water drain system and upon the judgment of the operator. A two (2) foot rise of wash-water per minute throughout the entire filter bed area is very common practice.

Notwithstanding the many schemes, devices and use of various filtering materials or media, up to the present time serious difficulties in proper washing or cleaning of filter beds or media still obtain. Among such may be mentioned the formation, principally during the rise of the wash-water in the bed, of "mud-balls," a term applied to a phenomenon familiar to those conversant with the art of water purification. This phenomenon can be briefly described as a conglomeration of impurities possibly originated by an organic particle embracing or attaching itself to another or to an inorganic particle thus forming a nucleus which due to the disturbing influences such as caused on washing of filter bed, collects accretions and increases in size somewhat in line with the action of rolling a snowball.

These mud-balls vary in size from small beads to diameters of several inches. They usually form at or near the surface of the filter bed. Increasing in size under the action of gravity and of filter and wash-water actions, they tend to permeate the body of the filtering medium greatly decreasing the filtering capacity and the efficiency of operation of the filter.

After several years of operating a most successful filter plant and of experimenting to solve and overcome the "mud-ball" and other detrimental conditions, I have succeeded in devising and inventing a comparatively simple method and apparatus eliminating and overcoming the "mud-ball" and other attendant conditions detrimental to efficient and reliable operation of liquid filters.

I have found that when washing a filter of the type stated, the sand bed and possibly a portion of the gravel bed increases in volume, that is, the surface of the sand bed when washing is usually several inches higher than the normal surface level when filtering. The amount of this rise will depend upon the velocity of the wash-water rise, the characteristics of the sand and sand bed, the character of the impurities, the temperature of the water and several other attendant factors. As the wash-water moves substantially in a vertical direction and as the mass of sand is considerably expanded and extenuated due to its increase in volume, I provide water nozzles or jets practically situated above the normal filter bed level and just below the surface of the raised sand bed, (while washing) substantially in a horizontal plane, the nozzle streams shooting out practically at right angles to the vertically rising wash-water. The arrangement of such nozzles or jets as stated is preferably in rectangular filter beds not widely varying from a square, the nozzles being preferably four (4) in number, situated symmetrically at the center of the rectangle, the nozzle streams being directed along diagonals toward respective corners. In such case the outward and return surface stream lines of the four nozzles markedly resemble the form of a four leaf clover. The mud-balls and other impurities are disintegrated by the force of the horizontal nozzle streams issuing at practically right angles to the vertical wash-water flow forming resultants tending to cause the nozzle streams to rise from points near issuance from nozzle as they pass outward toward the walls of the filter bed.

Another object of my invention is to provide an apparatus to conveniently enable the nozzles to be adjusted to the proper distance below the upper surface of the sand bed when washing the filter so that a shallow depression or pocket will be formed in the sand bed at the jet end of the nozzle and project a few inches ahead of the nozzle. This is a preferred condition of operation when washing filters and using method and devices embodying my invention. Near the outboard end of this depression or groove the resultant action caused by the vertically flowing wash-water causes the nozzle stream to be diverted from its original substantially horizontal line of issue. Such adjustments are essential as changes in temperature of water being filtered, varying rates of wash-water flow, changes in quantity and character of impurities and other causes effect the density of the filtering medium when washing and thereby cause a change in the top level of the filtering medium when washing.

I prefer to arrange center nozzles in pairs of opposing members for purpose of counteracting hydraulic reactions and balancing nozzle-system. It is not my intent to confine the arrangement nor number of nozzles to balanced system or systems as in actual service conditions other arrangements of nozzles may be found desirable.

My invention can be applied practically without interference with the integrity of the upper surface of the filter bed or medium when filtering, thus preserving maximum uniformity of filter bed mass and surface. It is my preferred practice to keep the filtering mass as free from irregularities of action as possible throughout which would be caused, for example, by the passing of supporting and fluid conductor members up from the bottom through the filter bed. Thus, one of the aims of my invention is to provide for washing and cleaning the entire filter bed.

It is highly desirable in water-supply systems to obtain efficient water purification within reasonable cost, and it is accordingly also an important object of this invention to provide to that end not only a much more efficient method and apparatus for the washing and cleaning of filter beds; but of reasonable first cost and cost of operation as will be apparent as the invention becomes more clearly understood from an examination of the specification and claims in conjunction with the accompanying drawings wherein:

Fig. 2 is a longitudinal sectional fragmentary view of the filter unit of which Fig. 1 is a plan embodying this invention.

Fig. 3 is a longitudinal, fragmentary sectional view of a manually controlled sand washing device embodied in my invention.

Fig. 4 is a fragmentary view, taken at 90 degrees to Fig. 3.

Fig. 5 is a fragmentary view taken at 90 degrees to Fig. 3, and indicating manner of support between two wash-water troughs and guide for adjustable nozzle water-supply sleeve.

Fig. 6 is a fragmentary, longitudinal section of Fig. 1, indicating a manually controlled sand washing device, a system of supports from wash-water troughs and flexible connection in water supply to vertical nozzle water-leg.

Fig. 7 is a fragmentary view of sand washing device taken at 90 degrees to Fig. 6, and indicating support between two wash-water troughs.

Fig. 8 is a fragmentary view of sand washing device similar to Fig. 7 but arranged to meet the condition of nozzle system center coming under a wash-water trough.

Fig. 9 is a fragmentary longitudinal section of a filter unit provided with a hydraulically controlled sand washing nozzle system.

Fig. 10 is a fragmentary plan view of hydraulically controlled sand washing system as indicated in Fig. 9.

Fig. 11 is a vertical longitudinal detail of four-way valve control indicated in Figs. 9, 10, 12 and 13.

Fig. 12 is an enlarged longitudinal, fragmentary sectional view of a hydraulically operated and controlled wash-water nozzle system as indicated in Figs. 9 and 10.

Fig. 13 is a fragmental cross sectional plan view of Fig. 12.

Fig. 14 is a fragmentary plan detail of supports between two wash-water troughs taken at 90 degrees to view shown in Fig. 12.

Fig. 15 is a fragmentary vertical view of support for hydraulic wash-water nozzle control system as shown in Fig. 12.

Fig. 16 is a fragmentary vertical detail of support member taken at 90 degrees as indicated in Fig. 13.

Fig. 17 is a plan detail of a four-nozzle stream unit.

Fig. 18 is a fragmental vertical section indicating lower end of downleg or wash-water supply sleeve and nozzle cross casting.

Fig. 19 is a fragmentary plan of a wash-water nozzle system for a large filter bed.

Fig. 20 is a cross sectional view of a wash-water nozzle system as shown in plan Fig. 19.

Fig. 21 is a fragmentary plan of Figs. 19 and 20.

Fig. 22 is a fragmentary section taken at 90 degrees to Figs. 20 and 21, indicating end of nozzle header and common control shaft of the three-nozzle devices.

Fig. 23 is a fragmentary section of a portion of filter bed indicating the normal level of sand bed when filtering, level of sand bed when washing and preferable relative position of wash-water nozzle to top sand level when washing.

Fig. 24 is a fragmental plan view of a rectangular filter basin with wash-water control nozzle device and secondary nozzle system.

Fig. 25 is a fragmentary cross sectional view taken in a transverse plane slightly in advance of the center of wash-water nozzle system.

Fig. 26 is a large filter for explanation assumed four times larger than that shown in Fig. 24 and provided with four wash-water nozzle control devices.

Fig. 27 is a fragmental plan view of a filter basin as indicated in Fig. 26 taken along the line 27—27.

Fig. 28 is a fragmentary plan view of a filter basin practically twice as long as wide, showing two wash-water nozzle control devices and a transverse baffle between the two half areas of basin.

Fig. 29 is a fragmental cross section of filter basin indicated in Fig. 28 taken on the plane through line 29—29 and indicates the longitudinal baffle separating the two half areas.

Figure 1:
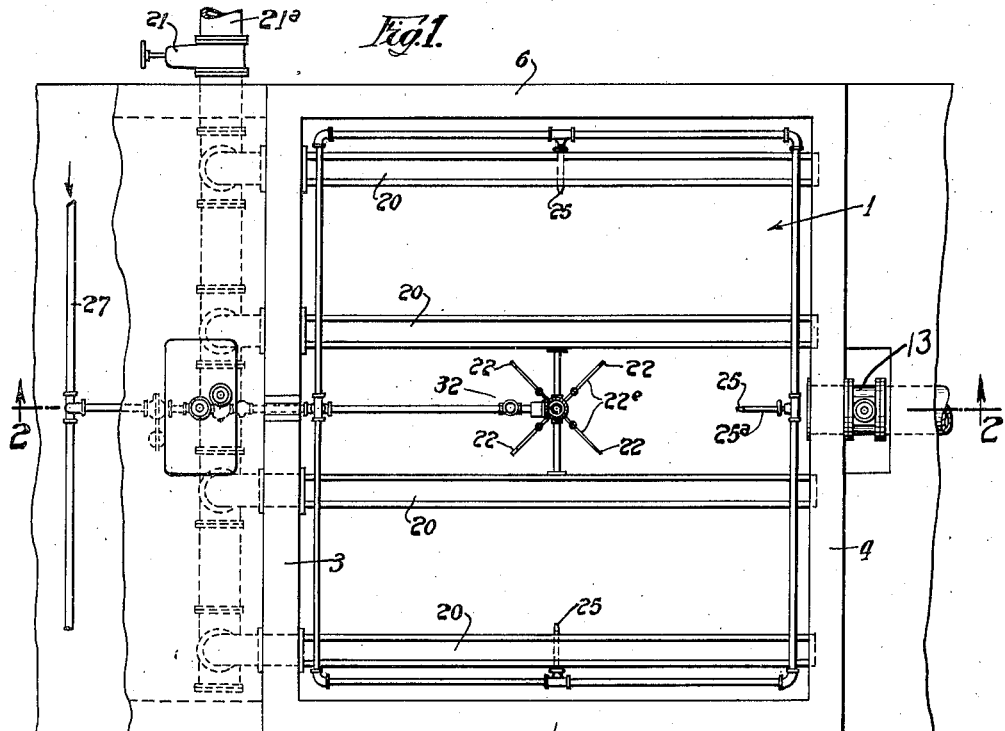
Fig. 1 represents a plan, fragmentary view of a filter unit embodying this invention.

Figs. 30, 31 and 32 respectively, indicate auxiliary nozzle devices as generally indicated in Fig. 19.

Referring to the drawings more particularly, reference character 1 (see Figs. 1 and 2) designates, generally, a filter basin of the rapid sand filter type. The basin 1 includes a bottom 2, end walls 3 and 4 and side walls 5 and 6.

The basin 1 contains a filter bed 7 including a gravel layer 8 and a sand layer 9. When filtering, the sand layer 9 extends only to the level 10 but when the bed is being washed the sand layer rises a substantial distance due to the action of the wash-water flowing upwardly in the bed causing the top level thereof to extend to the level 11.

The basin 1 is provided with an inlet fitting 12 to which is connected an affluent valve 13 through which settled water desired to be filtered is delivered to said basin.

Beneath the filter bed 7 is arranged a series of collector or drain tubes 14. These tubes 14 are apertured to receive the filtered water and extend through the wall 3 of the basin and are connected to a collector header 15. The header 15 is provided with an effluent valve 16 through which the filtered water can be delivered to piping 17 leading to a reservoir or a clearwell (not shown).

When it is desired to wash the filter affluent and effluent valves respectively 13 and 16 are closed and the drain and wash-water valves respectively 21 and 18 are opened, all in the order stated. The wash water flows from wash-water main 19 through the valve 18 into the collector header 15 and from there into the tubes of the underdrain system and through the apertures in tubes upwardly through the gravel and sand layers 8 and 9 of filter bed and over the edges or weirs of waste-water troughs 20 into the drain header 21a and through the drain valve 21 into the waste water drain or sewerage system (not shown). This vertical flow of wash water causes the sand bed to become greater in volume and consequently of greater fluidity resulting in its upper surface level being raised several inches above its normal level when filtering. This change is indicated in Fig. 1 as level 10 to level 11.

During the process of filtering, mud-balls and other undesirable forms of matter frequently permeate the filtering medium. Hitherto, great difficulty has attended the elimination of mud-balls and the cleaning and washing of the entire sand bed.

In general to eliminate mud-balls and other undesirable forms of matter, I provide preferably four main or primary nozzles 22 which may be attached to or be integral with respective branch piping 22e projecting radially in a horizontal plane from a common casting 23 which in turn is carried by a downleg 24 forming a part of a surface sand washing device or water jet system which will be more particularly described hereinafter. The nozzle or jet portion of system is placed substantially at the horizontal center of the filter basin and above the normal filter bed level 10 so as not to interfere with the filtering integrity of the filter bed and just below the surface 11 of the sand layer when washing filter.

The nozzle streams or jets shoot out practically along the diagonals toward respective corners of the filter basin and substantially at right angles to the vertically rising wash-water current.

I may also provide secondary or auxiliary nozzles 25 which if used are positioned in horizontal plane or planes between the normal filtering level of bed 10 and washing level 11. These nozzles indicated four in number, in spaced relation to primary nozzles and directed toward center of filter basin. These secondary nozzles 25 are connected to downlegs 26 respectively which in turn are connected to the nozzle water supply system previously referred to.

The system for controlling the jets from nozzles 22 and 25 includes a source of water supply which may be the plant general service main 27 or other suitable and available source of water supply. The pipe line 33 from supply main 27 to sand washing device Fig. 3 is provided with a gate valve 28, a reducing valve 29, a control valve 30, a plug cock 31 to be used to effect pressure changes in nozzle piping system and an air relief valve 32 to prevent sucking raw water from filter basin back into filtered water supply system.

Figure 2:
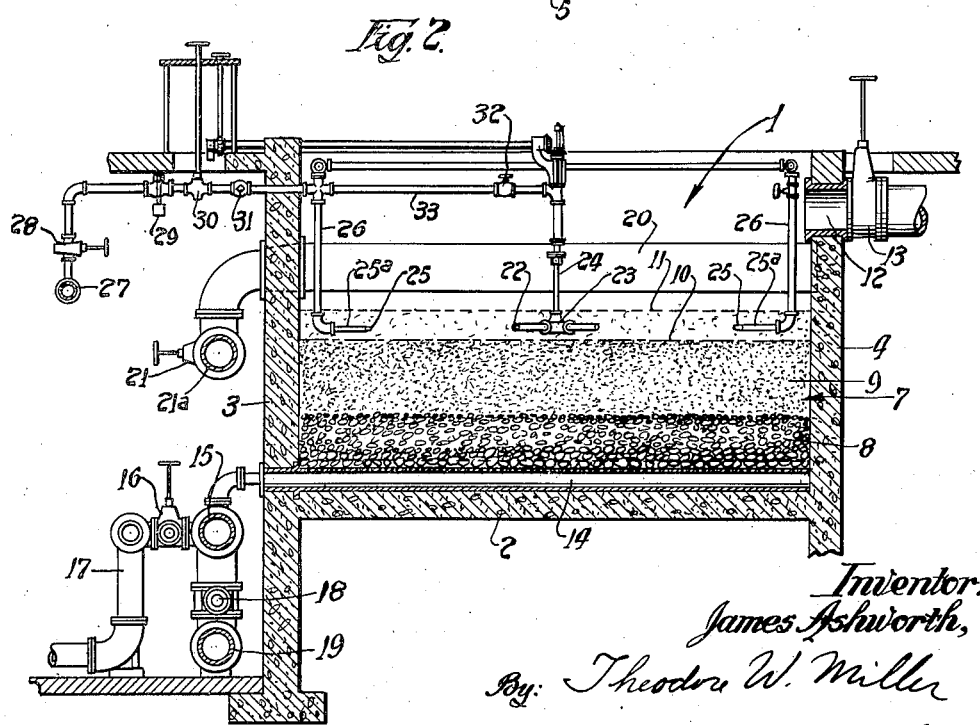

It is obvious that for actual operation and control of sand washing device as indicated in Figs. 1, 2, 3 and several other figures hereof, that only the control valve 30 in nozzle supply pipe line 33 is necessary, the other valves and fittings in said line being for convenience, safety or for special functions as described.

As shown in Fig. 3, pipe 33 connects to a flanged elbow 34 provided with a bracket supporting a yoke or guide section 47, a vertical cylinder 35 containing a hollow plunger 36 being bolted to its lower flange. The lower end of the cylinder 35 receives the lower end of the plunger 36 and is provided with a stuffing box 37 surrounding said plunger. The lower end of the cylinder 35 is also provided with oppositely extending flanges 38 which are apertured to receive supporting rods 39 extending through said flanges and in threaded engagement with a guiding and supporting casting 40. The casting 40 is provided with a central vertical opening through which the downleg 24 is guided. This casting 40 is provided with oppositely extending support pipes 41 which are provided with flanges and bolted to the sides of waste water troughs 20 for rigidly supporting the guide 40 in a central position. The upper side of the casting 40 has bolted thereto a bearing plate 42 which is apertured to receive the downleg 24 and contains a resilient guide bearing 43 preferably made of rubber composition which assures against binding and permits vertical movement of downleg thereof within the said casting. The elbow casting 34 is provided with an opening to receive a vertical stem 44, the lower end of which is threaded to the hub 45 of an integral spider 45 within the upper end of plunger 36. The upper end of the stem 44 extends upwardly through a stuffing box 46 in the casting 34 and through a guide opening in the upper part of a yoke casting 47. The upper portion of the stem 44 is threaded and engages with an internally threaded bevel gear wheel 49 provided with a restraining plate 50 made in halves and bolted to yoke 47 which is provided with a key or feather 47a engaging slot 44a in stem 44. Thus as the gear wheel 49 is rotated, the central threads thereof cause the stem 44 to raise or lower the nozzles 22. The yoke 47 is cast with a lateral arm 51 provided with a bearing 52 carrying a horizontal shaft 53 to one end of which is keyed a bevel gear 54 which meshes with the gear 49. The horizontal shaft 53 is provided with suitable bearing supports and at the filter gallery floor carries a worm wheel 55 which engages a worm on a vertical stem 56 of a control wheel 57. An indicator pointer 58 threadedly mounted upon the upper end of the stem or rod 44 is adapted to function with a vertical scale 59 mounted upon the casting 47 parallel to said stem. As variations in temperature of water, wash-water rate and other attendant factors affect the position of the top level of the filtering medium, and when using my washing device, it is advisable to adjust primary nozzle system so that the nozzles will be just below the surface of the top level of filter medium when washing, a scale 59 and co-operating pointer 58 are provided to facilitate the determining of the effects of such changes in levels and to enable adjustments to be made in vertical position of nozzle system previous to washing. It is obvious that automatic indicating and recording apparatus (not shown) may be provided in lieu of visual scale device herein designated.

In Figs. 6 and 7 is shown a modified arrangement wherein in place of the plunger and cylinder construction for extending the downleg for the nozzles, a flexible tube 60 connects the water supply pipe 61 and the elbow casting 62 attached to the downleg 63 for the nozzles (here designated 22a). In this case a stem 64 is suitably attached to the casting 62 for raising and lowering together with the nozzles 22a. Here the stem 64 is raised or lowered by a centrally threaded gear 65 similar to that in the previous embodiment and likewise controlled by a gear 66 on a horizontal shaft provided with a hand wheel 67. In this embodiment the supply pipe and other parts just described are supported from uprights 68 and 69 and uprights 70 and 71 mounted in the wash-water troughs (here designated 20a). These uprights 68, 69, 70 and 71 are provided with suitable cross pieces as shown to complete the support for the parts described.

As shown in Fig. 8, I provide a modified form of nozzle system to meet a condition wherein the nozzle system center comes under a wash-water trough. This arrangement is very similar to that just described except that the downleg 63b is provided with a lateral extension 70 which in turn is connected to the central supporting piece 23b for the nozzles.

Figures 9 to 16 inclusive, are drawn to an embodiment of this invention wherein a hydraulically operating plunger is used to raise or lower the nozzles here designated as 22c. As shown in Fig. 9 elements 27c, 28c, 29c, 30c and 31c are the same as elements 27 to 31 described in connection with the first embodiment. The downleg 24c for the nozzles 22c is movable within a guide cylinder 35c similar to the cylinder 35 in the first embodiment. This cylinder 35c is flanged and bolted to an elbow 34c similar to the elbow 34 in the first embodiment and likewise connected to the water supply pipe 33c. This fitting 34c has mounted thereon a hydraulic cylinder 72 containing a piston 73. The piston 73 is provided with a piston rod 74 which connects said piston with the top of downleg 24c. A stuffing box 75 in the bottom of cylinder 72 prevents leakage from said cylinder past said rod. Stuffing boxes 46c and 37c are also provided similar to parts 46 and 37 in the first embodiment. A cylinder head 76 is bolted to the top of cylinder 72. An indicator rod 77 is attached to top of piston 73 and extends upwardly carrying a pointer 78. The cylinder head 76 is provided with a stuffing box 79 for the extension rod 77. The pointer 78 co-operates with a scale 80 mounted upon the cylinder head 76 in a manner similar to the co-operation between pointer 58 and scale 59 in the first embodiment. A fourway valve 81 is connected to admit water under pressure either over or under piston 73 and exhaust the water from the lower or upper portion of cylinder 72, as may be required, through pipes 82 and 83. Water under pressure is led thru pipe 84 to the valve 81 and pipe 85 discharges exhausts into filter basin.

The four-way valve for controlling movement of piston 73 to raise or lower nozzles 22c is operated by a hand wheel 86 on shaft of a worm 87 in mesh with a worm wheel 88. The worm wheel 88 is rigidly mounted on a shaft 89 provided with a grooved wheel 90. The wheel 90 has attached thereto a flexible wire or cord which runs over and is attached to wheel 92 mounted upon valve spindle 93 of the four-way valve 81. A counterweight weight 94 in conjunction with hand wheel 86 and connecting mechanism and wire or cord 91 enable the valve 81 to be moved in either direction thus permitting nozzle 22c to be raised or lowered as desired.

To prevent movement of piston due to leakage after nozzle 22c has been adjusted and the valve 81 is closed, the three-way valve 95 in pipe line 85 which was turned to permit water passing from supply main 27c to control valve 81, is turned to cut off supply line 27c and to relieve pressure from valve 81 thus removing tendency to travel in either direction and maintaining nozzles 22c in adjusted position. The valve 95 in this position discharges water in pressure line 85 thru drain pipe 96 into filter basin at the same time preventing any raw water being drawn up into filtered water system.

In Fig. 12 the downleg 24c is shown directly connected to the stem 74 instead of through the intermediary of a guide plunger such as 36 in the first embodiment.

In the construction shown in Figs. 12, 13, 14 and 15 the cylinder 35c enclosing the downleg 24c, instead of being held in position by single pipes such as 41, is held by a two pipe support 97 which extend through a rectangular guide casting 98 of the downleg 24c. This guide casting 98 is provided with a pair of upwardly extending distance rods 99 and nuts engaging arms 100 on the cylinder 35c thus holding it rigidly in place.

Fig. 16 indicates a support secured to pipe 33c with a cross arm one side holding pipe 85 and other side forming a lead for wire or cord 91.

Figs. 17 and 18 show in detail the four nozzle stream unit. The nozzles 22 may be integral with branch piping 22e or be attached to such as indicated. A plug cock 101 or valve may be placed in nozzle or branch piping to adjust individual nozzle streams or jet intensities.

As shown in Figs. 19, 20, 21 and 22 a modified form of my invention may be utilized for a large filter bed. Reference character 102 designates a wash-water supply main adapted to supply water under pressure to a longitudinal washwater nozzle header 103 containing three sets of primary nozzles 22d and eight sets of auxiliary nozzles 104. The header 103 also contains, as shown more particularly in Fig. 20, connection T's 105 for connection to downlegs 106. The downlegs 106 are connected to the wash-water main 102 and wash-water nozzle control devices each similar to that shown and described in the first embodiment except that in this case the three devices are operable simultaneously maintaining the nozzle header 103 in a horizontal plane. Each wash-water control device includes the means for extending or retracting the downleg 106 as in the first embodiment involving the threaded rod 107 which corresponds to rod 44 in the first embodiment. In place of the bevel gear 49 in the first embodiment there is, here used, a worm-gear 108 in mesh with a worm 109 on a horizontal shaft 110 mounted in bearings 111 and 112 at either end of the filter basin. Hand wheels 113 at the ends of shaft 110 may be operated to raise or lower the nozzle header 103. An auxiliary nozzle system is also shown in Figs. 19 and 22 inclusive and includes pipes 114 extending around the inner-wall of the filter bed and connected through T connection 115 and valve to the wash-water supply main 102. The auxiliary nozzle piping 114 has connected therein a series of inwardly extending auxiliary nozzles 116 adapted to shoot water in toward the center of the bed below the level thereof during the washing operation.

In Fig. 23 there is shown diagrammatically the relative position of a primary nozzle 22 with respect to the level 10 of the sand bed during action of filtering and the level 11 of sand bed during the operation of washing filter. For practical purposes the level 10 may be considered constant and the level 11 subject to variations. The nozzle 22 is located in the space between the level 10 and 11 and is put in practical operation only when the sand bed of filter has been raised by expansion or otherwise by the practically vertical wash-water flow to a level designated 11. I have found that the best results are obtained when the primary nozzles 22 are adjusted to the relative position shown in Fig. 23, such that a shallow depression or pocket will be formed in the surface of sand level 11 at or near the jet end of the nozzle and projected a few inches in advance thereof. As changes in water temperature, changes in rate of vertical wash-water flow and changes in other attendant factors may cause variations, or changes in upper level of the sand bed when washing filter, it is essential to obtaining efficient results to provide means to adjust the position of nozzle 22 to meet fluctuations in level 11.

As shown in Fig. 24 the movement of travel of various particles on or near the surface of the sand bed during the washing operation is roughly indicated. As shown in said figure the horizontal flow under the action of the nozzles 22 is outward from the center of the bed along diagonal lines toward the corners where the flow is split and extends along the sides of the bed and back toward the center.

If deemed advisable such return action may be accelerated and any dead spaces in filter medium eliminated by proper use and placement of auxiliary nozzles 25. These auxiliary nozzles need not be as large as the central or main wash-water nozzles 22, neither is it necessary to make them adjustable to changes of upper level of bed when washing.

Figs. 26 and 27 indicate an arrangement of my washing device as applied to large filter basin and filter bed assumed to be four times larger than that shown in Fig. 24. This larger filter is shown provided with four wash-water nozzle systems or nozzle control devices generally designated by the reference character 144. A longitudinal baffle 145 and a transverse baffle 146 are supported beneath the waste-water troughs, partition the filter bed into four practically equal areas and volumes.

Figs. 28 and 29 show an arrangement similar to that of Fig. 24 as applicable to filter basin practically twice as long as wide. This basin contains two wash-water nozzle control devices 144 and a transverse baffle 147 between the two one-half areas.

In Fig. 22 is indicated a longitudinal baffle (parts 151, 151a, 151b) made of any suitable material, extending from above the highest assumed level 11 of sand bed when washing filter and preferably penetrating into the gravel or equivalent material layer 8 of filter bed.

It is evident that the four nozzle streams passing just below the top surface of the extenuated sand bed and subjected to the vertical action of the wash-water, impel portions of the top layer outwardly to the filter basin or baffle walls. This action of the nozzle streams creates an area of low pressure in and adjacent to the immediate nozzle area. The jets or discharge streams from the nozzles 22 driving the water and sand mixture to the filter basin walls build up higher pressure zone or zones. As the sand and water mixture is in a partially fluid condition the outermost high portions of sand bed tend to cause movements toward the nozzle or low pressure area. Some of the returns to center come back as in general indicated in Fig. 24 over the surfaces between the areas directly influenced by the outward flowing nozzle streams. Not only is the surface of filter bed affected but practically the whole filtering medium is similarly affected as indicated in substance by movement or replacement lines in Fig. 25.

After a comparatively few washings, substantially the entire mass of sand bed under the condition of lessened tenuity will have been exposed to the hydraulic bombardment by the nozzle streams. This has been proven by examination of actual service filter beds, before and after the application of my invention.

Symmetrical design is shown for the most part in drawings hereof, but my invention is applicable to irregular layouts or forms of filter beds. In cases of very large filter beds or filter beds in which there are considerable differences in the dimensions of widths to lengths by means of baffles the total area may be divided into two or more areas each having its individual wash-nozzle system.

As shown in Figs. 30, 31 and 32 the nozzles may take various forms. The nozzles of Figs. 30 and 31 are particularly adapted for counteracting hydraulic reactions, the former being arranged with two opposing pairs and the latter taking the form of two opposing nozzles.

I am aware that many changes may be made without departing from the principles of my invention and I, therefore, do not wish to be limited to the details shown or described.

I claim:

1. The combination of a wash-water supply line, an extensible downleg connected thereto and means associated with said downleg for delivering wash-water to a filter bed for breaking up particles therein and means for adjusting said downleg for varying the vertical position of said delivering means.

2. The combination of a filter bed, means for causing upward flow of wash-water through the bed and means for simultaneously causing a fluid stream to cross the upward wash-water flow to break up particles within the bed, said last means discharging just below the wash-water level of the bed and means for varying the vertical position of said second mentioned means for accommodating variations in wash-water level of said bed.

3. The combination of a filter bed, means for causing a vertical wash-water flow through the bed and means for traversing such vertical flow by pressure streams issuing from a centrally located nozzle system discharging toward filter basin walls in the space above the normal sand level when filtering and just below the wash-water level of the filtering medium of bed, for the breaking up masses of particles within the bed.

4. The method of washing a filter bed by causing an upward wash-water flow and simultaneously causing a fluid flow cross-wise to said upward flow arranged to produce an area of low pressure preferably near central portion of bed and high pressure areas at or near filter basin walls thereby creating circulatory action throughout the filtering medium.

JAMES ASHWORTH.